J. ROUSE.

Making Hinges.

RX No. 75.

Reissued Aug. 9, 1845.

9666X Related Doc

N. PETERS. Photo-Lithographer, Washington, D. C.

UNITED STATES PATENT OFFICE.

AMES ROY & CO., OF TROY, NEW YORK, ASSIGNEES OF JONAS ROUSE, OF SAME PLACE.

Rx 75

IMPROVEMENT IN MACHINES FOR MAKING BUTTS AND HINGES.

RELATED Doc 9666 X

Specification forming part of Letters Patent dated May 17, 1836; Reissue No. 75, dated August 9, 1845.

*To all whom it may concern:*

Be it known that JONAS ROUSE, of the city of Troy, in the county of Rensselaer and State of New York, did invent a new and useful Machine for Making Butts and Hinges; and we do hereby declare that the following is a full and exact description thereof.

The improvement is to be applied to the manufacturing of butts and hinges of malleable or ductile metal. The two plates which form the butt or hinge are to be prepared separately, as in the ordinary method of making hinges of the like description, each with projections from one edge, as tongues. corresponding to the spaces between the tongues of the other plate with and in which they are to match. These tongues turned or bent, one flatwise, form what are called the "eyes" of the hinge, and when placed together, the eyes of each plate between those of the other with a wire or rivet through them, constitute the joint of the hinge.

The machine here to be described is for bending the tongues of the hinge-plates from the straight and extended position they are in when thus prepared and forming them into eyes. To do this a die is to be formed in a block of steel or other suitable material to be provided for the purpose. This is to have an aperture or groove, as in Fig. 3, formed in one side, and reaching horizontally from end to end. This extends into the side of the block a distance equal to the width of the hinge-plate, and terminates in a circular enlargement, *b*, above the groove, which is at a tangent thereto.

Figure 2:
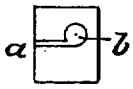
Figure 3:
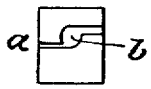

Fig. 2 is a modification of the die, which is divided horizontally into two parts, the division commencing at or near the back part of the circular termination *b*, and thence through to the back. In this the upper half can be removed when desired. In both the groove above named and the circular termination *b*, when viewed endwise will be the same as the outline. When the die, Fig. 3, is used, a lever, *d*, extends on one side of the frame from near the shaft to a point opposite the end of the die. It may be so connected with the machinery as to have a lateral movement out and in given to the end next the shaft by means of a cam upon the side of the wheel which turns the shaft, or of a wheel or pulley connected and revolving with it, so that by suspending or attaching it by a movable joint to a fixture of the frame provided for the purpose as its fulcrum at such point between the two ends as shall be selected the same reciprocating motion will thereby be given to the end opposite the die, and by attaching a follower, *f*, thereto, extending toward the end of the die and so as to have it move backward and forward in the direction of the length of the die, it may be made to enter into it and remove the hinge-plate after the eye is formed by pushing it out at the opposite end. The relative position of the cam which gives the motion in respect to the movement of the other follower may be such as to cause the inward and outward motion of the two followers so far as to alternate with each other, so that when the first is being withdrawn from the die, and preparatory to its return with another hinge-plate before it, the end follower will pass in and remove the plate which is finished.

Figure 1:
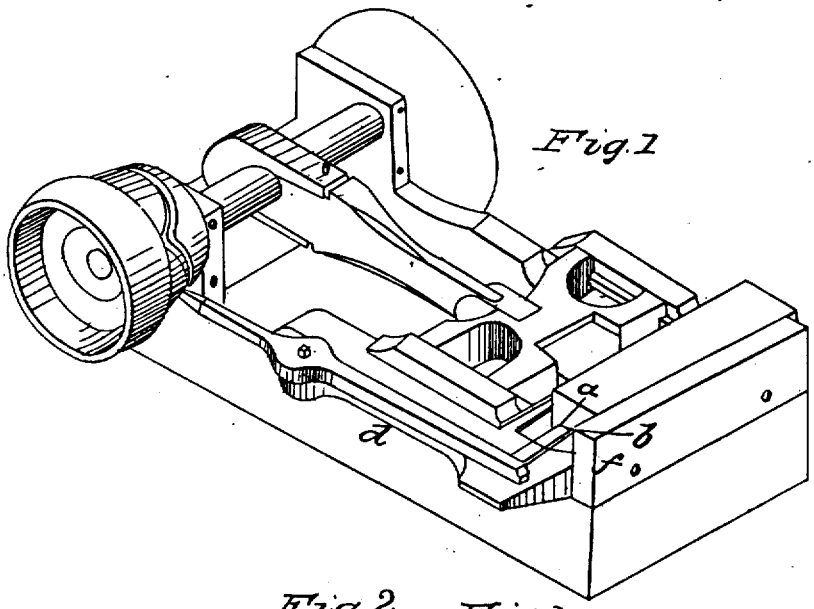
Figure 4:
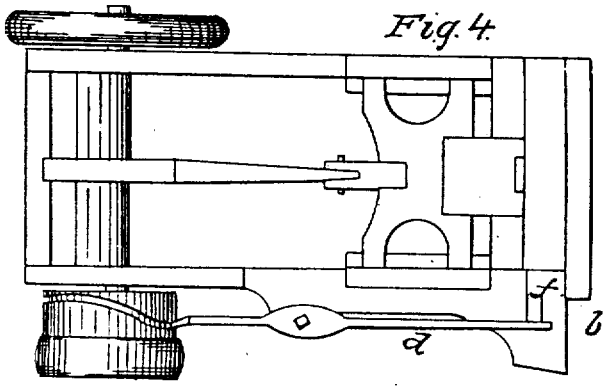

In the drawings, Figure 1 is a perspective view of the machine. *a* is the groove in the die; *b*, the enlargement. *d* is a lever for removing the hinge-plates when turned; *f*, the follower attached to the lever that enters the die to remove the hinge-plate. Fig. 3 is a modification of a die, end view. Fig. 2 is an end elevation of a die. Fig. 4 is a top plan of a profile or end view of the hinge-plate after the eye is formed. The whole of this opening is to be extended through the entire length of the block which constitutes the die, and the eyes of the hinge are formed by placing the plate with the tongues extended toward the circular termination *b* and forcing the tongues end foremost against the circular termination of the die, the effect of which will be that the tongues strike the circle at a tangent and the ends are forced round its surface, which for this purpose should be smooth, till the tongues form the proper curve in their whole length, so as to bring the ends over to their own surface, or to that of the plate to which they belong, and to form the eyes of the hinge. To effect this operation, a steel follower adapted to the edge of the hinge-plate should be provided, and a reciprocating movement given to it sufficient in extent and power to force the tongues effectually into the curve, and to return back far enough to allow the hinge-plate to be removed and another placed before the follower ready for a like operation. This may be done by fixing the die firmly upon a frame to be provided for the purpose, and causing a shaft with a cam or eccentric section to revolve before it, and a pitman or shackle-bar connected therewith and extended to and connected with the follower by a flexible joint such as is ordinarily applied to operations of that kind will give the movement required, or such other means or process as are commonly used for producing movements of like nature, as well as such methods for obtaining the necessary power.

The follower may be supported and kept true in its direction by means of projections, as arms or wings, extending from it horizontally, and connected, as by tongues and grooves or otherwise, with fixtures of the frame provided for the purpose.

Having thus fully set forth the improvements of the said JONAS ROUSE according to the best of our knowledge and belief, what we claim therein as his invention, and desire to secure by Letters Patent, is—

The method of turning or bending the tongues of hinge or butt plates and forming them into eyes as described by placing them on a flat surface of a die having a projection, *b*, therefrom, against which the tongues of the hinge-plates are forced by a follower, so as to bend them round into eyes, substantially in the manner and for the purpose above specified.

JAMES ROY.
JOHN KNOWER.
BEN. KNOWER.
ANDREW ROY.

Witnesses:
GEO. W. CURREN,
FRED. W. COLE.